Figure 1:
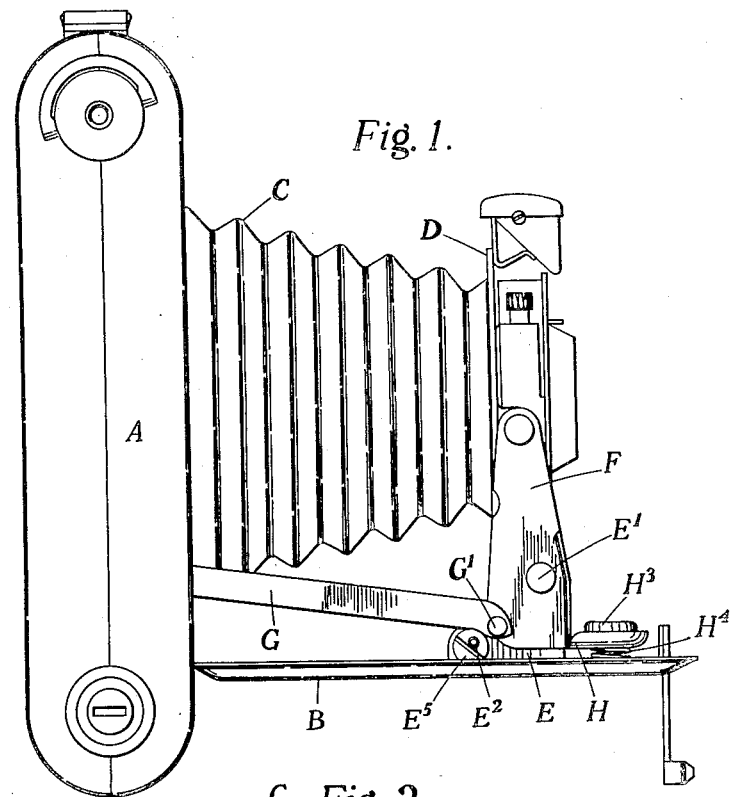

Sept. 25, 1934.  H. NAGEL  1,974,655

PHOTOGRAPHIC CAMERA

Filed May 11, 1933  2 Sheets-Sheet 1

Inventor,
Hugo Nagel,
By
Attorney

Sept. 25, 1934.  H. NAGEL  1,974,655
PHOTOGRAPHIC CAMERA
Filed May 11, 1933    2 Sheets-Sheet 2
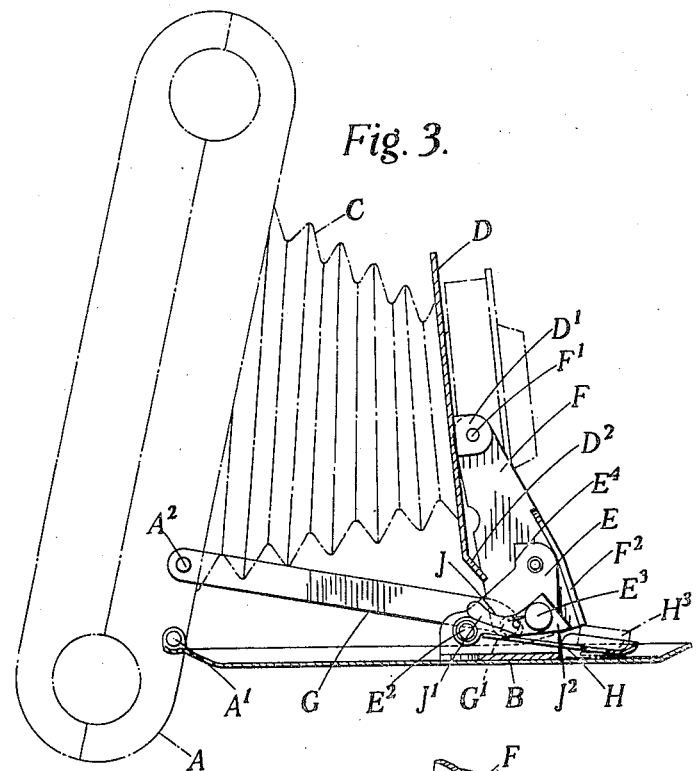
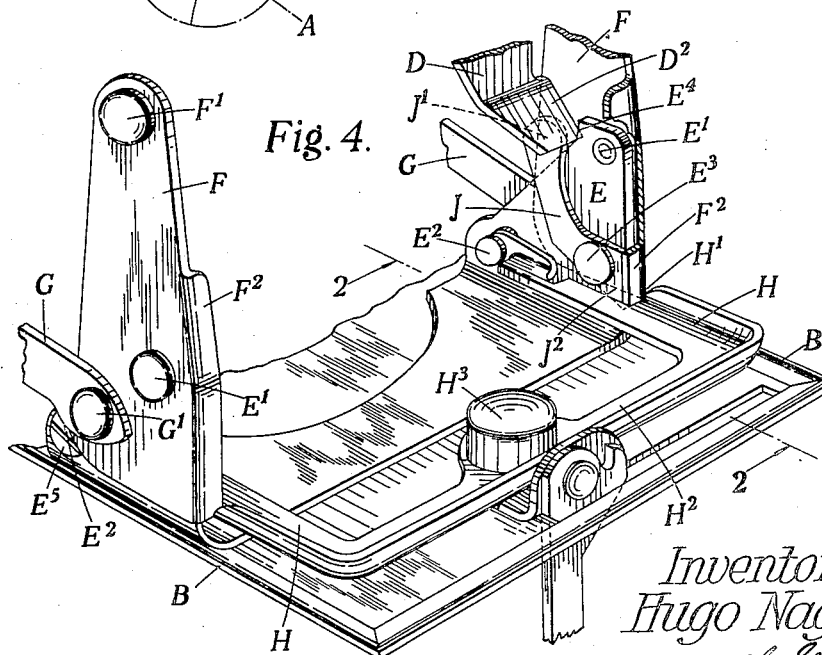
Inventor,
Hugo Nagel,
By
Attorney Patented Sept. 25, 1934

1,974,655

UNITED STATES PATENT OFFICE 1,974,655

PHOTOGRAPHIC CAMERA

Hugo Nagel, Harrow, England, assignor to Eastman Kodak Company, Rochester, N. Y., a corporation of New York Application May 11, 1933, Serial No. 670,457
In Great Britain May 13, 1932

11 Claims. (Cl. 95—40)

This invention relates to folding cameras of the self-erecting type in which there is an operative connection between the hinged base-board and the member carrying the lens so that when the base-board is opened the bellows are extended and the front erected.

Hitherto, except in the case of camera fronts supported by toggle mechanism, separate struts have been provided to support the base-board and hold it rigid when the camera is in its open position, and although with such struts the camera can readily be opened, its closing cannot be so easily effected.

The object of the present invention is to provide an improved construction of folding camera which combines rigidity when extended with a simple and economical construction, at the same time producing a camera which can be opened and closed with facility.

According to this invention the front or lens-board is carried by one or more levers pivoted to the base-board and a link so connects each lever to the body as to erect the lever when the base-board is opened, locking mechanism being provided acting on each lever to hold it in the erected position, and thereby maintain the base-board open and render unnecessary separate base-board struts. Preferably the locking mechanism is provided with a single release device conveniently arranged near the front of the base-board so that the camera can be closed when this device is actuated, as by pressure of a single finger.

In the preferred construction fixed supports or brackets are formed on the base-board having pivotally mounted upon them the levers, of which the upper ends are connected to the front or lens-board, while the lower ends are pivoted to links connected at their rear ends to the camera body. On the base-board a locking device is provided for holding one or each of the levers and its respective link in its extended or operative position and additional locking devices are provided on each support adapted to maintain the front or lens carrying member in its erect position. A single actuating member serves to release all the locking devices.

Such an arrangement eliminates the need for separate base-board supporting struts and the camera is not only self-erecting but closes almost automatically merely by the actuation of a single release device conveniently situated centrally near the front of the base-board. Not only is the construction considerably simplified but the whole structure is rigid when erected and there is no lost movement between any of the members as in existing constructions. When the front is erected the main locking device firmly holds the links and levers against movement, while in addition rocking movement of the lens front upon its pivot is entirely prevented by the additional locking devices on the supports, which are positively brought into operation directly the front assumes its erected position.

Figure 2:
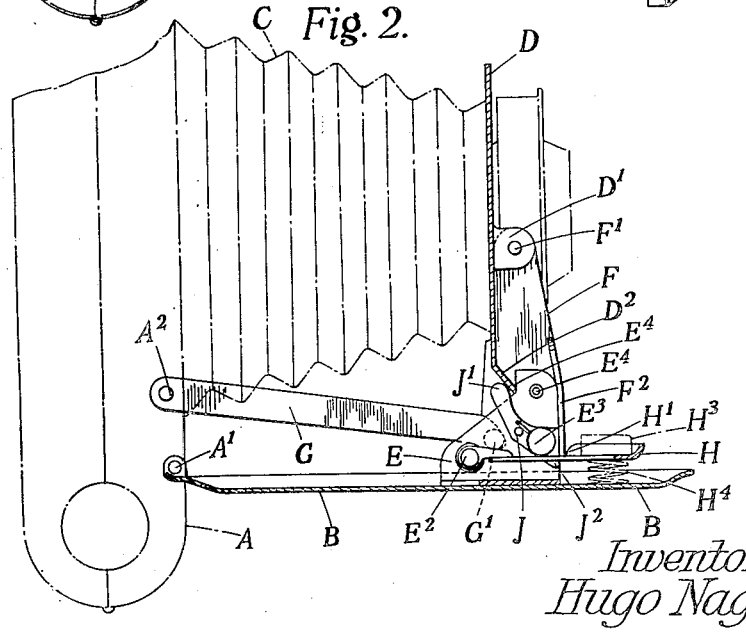

The construction of the camera can be modified within wide limits without departing from the present invention and one example of a preferred construction according to the invention is shown in the accompanying drawings, in which Figure 1 is a side elevation of a folding camera with self-erecting front in the open or erected position, Figure 2 is a section in a vertical plane containing the line 2—2 indicated in Figure 4 showing the erecting mechanism at the left-hand side of the camera when in the erected position, Figure 3 is a view similar to Figure 2 with the locking device released and the camera partly closed, and Figure 4 is a perspective view of parts of the erecting mechanism showing the form of the locking device.

Like reference letters indicate like parts throughout the drawings.

The body A of the camera is of known type comprising a central recess normally closed by means of a base-board B hinged to it at $A^1$ and adapted to accommodate when the baseboard is closed the bellows C, the lens and its supporting front D and the erecting mechanism.

Near the outer end of the base-board are provided two fixed or rigid supports E and on these supports are pivotally mounted at $E^1$ levers F connected by pivots $F^1$ to lugs $D^1$ on the lensboard or front D. The lower ends of the levers are connected by pivots $G^1$ to links G connected to the body at their rear ends by pivots $A^2$.

The pivots are so arranged that when the baseboard is opened lever F is rocked about its pivot $E^1$ by means of the link G so as to assume a substantially upright position. At the same time the lens-board is free to rock about the pivots $F^1$ and owing to the stiffness of the bellows will normally remain in a substantially vertical plane.

The levers F are of angle section or are provided with inwardly projecting stops or flanges $F^2$ which engage the front edges of the fixed supports E when the levers are erected. In this way the downward movement of the baseboard is definitely limited. Any return movement is prevented by means of locking arms H pivoted at $E^2$ to the fixed supports E. The locking arms extend forwardly and each is provided with a shoulder H¹ to engage the lower edge of the flange F² and hold it firmly against the forward edge of the bracket E. In this way rocking of the lever F in an anti-clockwise direction is prevented and the link G serves as a strut to hold the base-board in its fully extended position.

As shown in Figure 4 the two locking arms H are formed in a single piece with a bridging bar H² connecting their forward ends together and provided with a finger piece H³ conveniently arranged about its middle. A spring H⁴ beneath the bridging bar urges the locking member upwards into its locking position.

Since the lens-board or front D is pivotally connected to the upper ends of the levers F it must be prevented from rocking about its pivots after it has assumed its erect or vertical position. To this end each of the supports E is provided with a latch J pivoted to it at E³ and urged by a spring (not shown) in an anti-clockwise direction as seen in Figure 2. The lens-board D is provided with downwardly extending fingers or extensions D² which engage shoulders E⁴ on the brackets E. The longer arm J¹ of the latch J is of such length as to be capable of pressing against the rear face of the finger D² and holding it firmly against the fixed shoulder E⁴. The latch is actuated for this purpose by engagement of its tail or shorter arm J² by the flange F² of the arm F. Figure 3 shows the parts in a position in which if the camera is being opened the flange F² is about to engage the shorter arm J² of the latch J.

When the camera is to be closed the finger piece H³ is pressed towards the base-board thus releasing the latches H from engagement with the arms F. Directly the arms F begin to move they release the latches J from the lens-board extensions D² so that the camera can be closed without further difficulty. It will be noticed that to release the latches the finger piece H³ and base-board B can be conveniently pressed between the finger and thumb so that it is not necessary first to release the lock and then change the grip in order to close the base-board as is the case with constructions commonly employed. The base-board can be substantially closed with the finger and thumb in the positions which they occupy for releasing the lock and completely closed by retaining the thumb in the same position and moving the finger clear.

It will be seen that the mechanism relies entirely on pivoted joints and avoids the necessity for connections involving sliding and lost motion. In order to compensate for any variation in the thickness of the material and to take up any slack that might occur between the flanges F² and the shoulders H¹ of the locking member, the pivots of the locking member may if desired be made adjustable. Such an arrangement is shown in Figure 4 in which the pivot pin E² upon which the arm H is pivoted is carried eccentrically by a stud E⁵. The latter has a notch in it to receive a screwdriver by which it can be rotated so as to vary the position of the pin E² in the fixed bracket E. In this way even if some wear were to occur between the flange F² and the locking shoulder H¹ any play could be taken up and the accuracy and rigidity of the front restored.

It will be appreciated that although a link is preferably provided at each side of the base-board and although each of the front erecting levers is preferably furnished with a locking device, it is possible to have a single latch which might for example be carried centrally on a member connecting the lower ends of the two levers. Similarly, although it is better to have latches on each side of the lens-board to prevent movement of the lens-carrying member about its pivots, one such latch only can be provided if desired. The locking device which engages the lower ends of the levers may be of any suitable form and the device itself may be formed of spring material instead of being provided with one or more separate actuating springs.

The particular construction above described is singularly rigid when erected, although comprising a minimum number of parts formed of relatively light and easily worked materials. The levers, being of angle section over a greater portion of their length, provide a long contact surface for engagement with the front edges of the fixed supports, and with the aid of the latches on the supports the lower ends of the front are held closely against the rear edges of the fixed supports, so that the sides and front and rear edges of the supports are closely engaged by the front supporting mechanism when the camera is erected and in use. The spring-controlled locking device is automatically engaged when the camera is fully extended, and the single release mechanism for the various locking mechanisms enables the camera to be closed as quickly and easily as it is opened.

What I claim as my invention and desire to secure by Letters Patent is:—

1. A folding camera of the self-erecting type comprising in combination a base-board hinged to the camera body, at least one lever pivoted to the base-board, a front connected to the body by bellows and carried by said levers, a link pivoted to the body and to a lever to one side of the lever pivot whereby said link may erect the lever when the base-board is opened, and locking mechanism acting on each lever to hold it in the erected position and thereby maintain the base-board open and render unnecessary separate base-board struts.

2. A folding camera of the self-erecting type comprising in combination a base-board hinged to the camera body, at least one lever pivoted to the base-board, a front connected to the body by bellows and carried by said lever, a link pivoted to the body and pivoted to the lever to one side of the lever pivot whereby the link may erect the lever when the base-board is opened, locking mechanism acting on the lever to hold it in the erected position and thereby maintain the base-board open and render unnecessary separate base-board struts, and a single release device controlling the locking mechanism.

3. A folding camera of the self-erecting type comprising in combination a base-board hinged to the camera body and having fixed supports thereon, at least one lever pivotally mounted on the supports, a front connected to the body by means of bellows and pivotally connected to the upper end of the lever, a link connecting the camera body to the lower end of each lever, a lever locking device on the base-board for locking each lever and its respective link, at least one front-locking device mounted on one of the supports and actuated by the corresponding lever for maintaining the front in its erected position, and a single actuating member for releasing all the locking devices.

4. A folding camera of the self-erecting type comprising in combination a base-board hinged to the camera body, a fixed support on said baseboard, at least one lever pivotally mounted on the support and having an abutment shaped to engage and be held against the front edge of the support when the lever is erected, a front connected to the body by means of bellows and pivotally connected to the upper end of the lever, a link connecting the camera body to the lower end of the lever, and a locking device on the base-board for locking a lever and its respective link.

5. A folding camera of the self-erecting type comprising in combination a base-board hinged to the camera body, a fixed support thereon, at least one lever pivotally mounted on the support, a front connected to the body by means of bellows and pivotally connected to the upper end of the lever, a link connecting the camera body to the lower end of the lever, at least one lever-locking device on the base-board for locking at least one of the levers and its respective link, at least one front-locking device pivoted to the fixed support and shaped so as to be actuated by the lever mounted thereon for maintaining the front in its erected position, and a single actuating member for releasing all the locking devices.

6. A folding camera of the self-erecting type comprising in combination a base-board hinged to the camera body, at least one lever pivoted to the base-board, a front connected to the body by bellows and carried by said levers, a link pivoted to the lever and pivoted to the body, whereby the link may erect the lever when the base-board is opened, a spring-controlled arm affording locking mechanism acting on each lever to hold it in the erected position, and a single release member connecting the said arms for simultaneously releasing them.

7. A folding camera of the self-erecting type comprising in combination a base-board hinged to the camera body, at least one lever pivoted to the base-board, a front connected to the body by bellows and carried by said levers, a link pivoted to each lever and pivotally mounted on the body, whereby said link may erect the lever when the base-board is opened, a spring-controlled arm affording locking mechanism acting on each lever to hold it in the erected position, and a single release member arranged centrally near the front edge of the base-board connecting the said arms for simultaneously releasing them.

8. A folding camera of the self-erecting type comprising in combination a base-board hinged to the camera body, at least one lever pivoted to the base-board, a front connected to the body by bellows and carried by said levers, a link pivoted to each lever and pivoted to the body whereby said links may erect the lever when the base-board is opened, and at least one trigger member at one point affording a locking abutment to hold a lever in its erected position and at another point pivotally mounted by a mounting comprising a pivot pin eccentrically mounted in a bearing rotatably adjustable to enable slack to be taken up or slight variation of the locked position of the arms to be effected.

9. A folding camera of the self-erecting type, comprising in combination a base-board hinged to the camera body, a pair of fixed brackets thereon, a lever pivotally mounted on each bracket, a front connected to the body by means of bellows, pivotally connected to the upper ends of the levers and having downwardly projecting fingers, a link connecting the camera body to the lower end of each lever, a lever-locking device on the base-board for locking each of the levers and its respective link in its upright position, a front-locking device pivoted to each bracket, a single actuating member for releasing both the lever-locking devices, and an abutment on each lever shaped to engage and be held against the front edge of the corresponding bracket when the lever is in its upright position and also to engage one end of the corresponding front-locking device to swing that device about its pivot so that the other end locks the corresponding finger of the front against the rear edge of the bracket.

10. A folding camera of the self-erecting front type, comprising a base-board hinged to the camera body, a pair of links pivoted to the camera body at points spaced from the baseboard hinge, levers pivotally attached to said base-board and to the links, a latch mechanism adapted to hold said levers and links in a relatively fixed position in which the levers are erect and the base-board is opened, the links being the sole means for holding the base-board in an open position.

11. A folding camera of the self-erecting front type, comprising a base-board hinged to the camera body, a pair of links pivoted to the camera body at points spaced from the baseboard hinge, levers pivotally attached to said bed and to the links, a latch mechanism adapted to hold said levers in an erect position and to thereby hold said links in a position fixed relative to said levers, said links forming the sole connection between the camera body and the hinged base-board whereby said links may serve as braces to hold said base-board in an open position and may serve as operating members for said levers for holding the levers in an erect position.

HUGO NAGEL.